United States Patent
Zhang et al.

(10) Patent No.: US 12,131,433 B2
(45) Date of Patent: Oct. 29, 2024

(54) METHOD AND APPARATUS FOR ADJUSTING VIRTUAL FACE MODEL, ELECTRONIC DEVICE AND STORAGE MEDIUM

(71) Applicant: Beijing Baidu Netcom Science Technology Co., Ltd., Beijing (CN)

(72) Inventors: Yiyuan Zhang, Beijing (CN); Jiawei Liao, Beijing (CN); Yu Liu, Beijing (CN); Xi Huang, Beijing (CN); Xiaohua Ren, Beijing (CN); Xiaolin Huang, Beijing (CN); Huibin Zhao, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 142 days.

(21) Appl. No.: 17/653,380

(22) Filed: Mar. 3, 2022

(65) Prior Publication Data

US 2023/0083831 A1 Mar. 16, 2023

(30) Foreign Application Priority Data

Sep. 16, 2021 (CN) .......................... 202111089448.1

(51) Int. Cl.
*G06V 40/16* (2022.01)
*G06F 3/01* (2006.01)
*G06T 19/20* (2011.01)

(52) U.S. Cl.
CPC .............. *G06T 19/20* (2013.01); *G06F 3/012* (2013.01); *G06F 3/017* (2013.01); *G06V 40/161* (2022.01);
(Continued)

(58) Field of Classification Search
CPC ................. G06T 19/20; G06T 2200/24; G06T 2219/2016; G06T 3/40; G06T 7/00;
(Continued)

(56) References Cited

U.S. PATENT DOCUMENTS

2016/0042224 A1* 2/2016 Liu ...................... G06V 10/987
382/203
2020/0202111 A1* 6/2020 Yuan ....................... G06V 20/20
(Continued)

FOREIGN PATENT DOCUMENTS

| CN | 111324250 A * | 6/2020 | ......... G06F 3/04815 |
| CN | 111695471 A | 9/2020 | |

(Continued)

OTHER PUBLICATIONS

Chinese Supplementary Search Report issued for Chinese Patent Application No. 2021110894481, issued on May 25, 2022.
(Continued)

*Primary Examiner* — Chanh D Nguyen
*Assistant Examiner* — Nguyen H Truong
(74) *Attorney, Agent, or Firm* — ArentFox Schiff LLP

(57) ABSTRACT

The present disclosure provides a method and apparatus for adjusting a virtual face model, an electronic device and a storage medium, so as at least to solve the technical problems of tedious operation steps and poor user experience of conventional solutions for adjusting a virtual image. A specific implementation solution includes: a real human face in a reality scene is identified to obtain a first virtual face model of the real human face in a virtual scene; in response to a face-pinching operation acting on the real human face, the face-pinching operation is identified to determine at least one to-be-adjusted key point in the first virtual face model and an adjustment manner of the at least one to-be-adjusted key point; and the first virtual face model is adjusted to a
(Continued)

second virtual face model based on the adjustment manner of the at least one to-be-adjusted key point.

13 Claims, 2 Drawing Sheets

(52) U.S. Cl.
CPC .. *G06T 2200/24* (2013.01); *G06T 2219/2016* (2013.01)

(58) Field of Classification Search
CPC ..... G06T 7/11; G06T 7/50; G06T 7/90; G06T 7/246; G06T 11/00; G06T 11/60; G06T 13/40; G06T 15/00; G06T 15/50; G06T 17/20; G06T 19/00; G06V 40/161; G06V 10/24; G06V 10/26; G06V 10/46; G06V 10/77; G06V 10/774; G06V 40/10; G06V 40/16; G06V 40/20; G06F 3/012; G06F 3/017; G06F 3/01; G02B 27/00; G02B 27/01; G06N 3/08; G06N 3/045; G06N 20/00; G09K 9/00; G09K 9/36; G09K 9/46; G09K 9/62

See application file for complete search history.

(56) References Cited

U.S. PATENT DOCUMENTS

| | | | |
|---|---|---|---|
| 2020/0368616 A1 | 11/2020 | Delamont | |
| 2021/0081658 A1* | 3/2021 | Hosseinkhani Loorak | G06V 40/161 |
| 2021/0183166 A1 | 6/2021 | Hu et al. | |
| 2021/0375042 A1 | 12/2021 | Chen et al. | |
| 2022/0347575 A1* | 11/2022 | Wan | A63F 13/55 |
| 2022/0353474 A1* | 11/2022 | Springer | H04L 12/1818 |
| 2023/0215208 A1* | 7/2023 | Xu | G06V 40/161 382/103 |

FOREIGN PATENT DOCUMENTS

| | | |
|---|---|---|
| CN | 111739155 A | 10/2020 |
| CN | 112150638 A | 12/2020 |
| CN | 112541963 A | 3/2021 |
| CN | 112585566 A | 3/2021 |
| JP | H08305880 A | 11/1996 |
| JP | 2001331810 A | 11/2001 |
| JP | 2016515236 A | 5/2016 |
| WO | 2021093689 A1 | 5/2021 |
| WO | 2021115181 A1 | 6/2021 |

OTHER PUBLICATIONS

Extended European Search Report in EP22190038.4, mailed Feb. 20, 2023, 7 pages.
Search Report in CN2021110894481, mailed Mar. 15, 2022, 2 pages.
First Office Action of JP Application No. 2022-141929 issued on Nov. 22, 2023.

* cited by examiner

METHOD AND APPARATUS FOR ADJUSTING VIRTUAL FACE MODEL, ELECTRONIC DEVICE AND STORAGE MEDIUM

CROSS-REFERENCE TO RELATED APPLICATIONS

The present application claims priority to Chinese Patent Application No. 202111089448.1, filed on Sep. 16, 2021, the disclosure of which is hereby incorporated by reference in entirety.

TECHNICAL FIELD

The present disclosure relates to the technical field of Internet, and further relates to the field of computer vision. And in particular, the present disclosure relates to a method and apparatus for adjusting a virtual face model, an electronic device and a storage medium.

BACKGROUND

With acceleration of an Internet process, performance of mobile terminals has improved rapidly, thereby providing strong technical support for generation and development of more and more applications. Virtual image social application has become a popular communication and entertainment channel.

Currently, when the virtual image social application customizes and edits facial features and face shape of a virtual character image, at least one key point of a face of this virtual character image on a terminal interface is generally clicked and pulled up, down, left and right to modify and adjust the facial features and face shape of the face. However, the entire operation steps are complicated and tedious, thereby affecting the user experience.

SUMMARY

At least some embodiments of the present disclosure provide a method and apparatus for adjusting a virtual face model, an electronic device and a storage medium, so as at least to partially solve the technical problem of tedious operation steps and poor user experience of solutions for adjusting a virtual image in the related art.

In an embodiment of the present disclosure, a method for adjusting a virtual face model is provided. The method for adjusting the virtual face model includes that: a real human face in a reality scene is identified to obtain a first virtual face model of the real human face in a virtual scene; in response to a face-pinching operation acting on the real human face, the face-pinching operation is identified to determine at least one to-be-adjusted key point in the first virtual face model and an adjustment manner of the at least one to-be-adjusted key point; and the first virtual face model is adjusted to a second virtual face model based on the adjustment manner of the at least one to-be-adjusted key point.

In another embodiment of the present disclosure, an apparatus for adjusting a virtual face model is provided. The apparatus for adjusting the virtual face model includes: a first identification module, configured to identify a real human face in a reality scene to obtain a first virtual face model of the real human face in a virtual scene; a second identification module, configured to, in response to a face-pinching operation acting on the real human face, identify the face-pinching operation to determine at least one to-be-adjusted key point in the first virtual face model and an adjustment manner of the at least one to-be-adjusted key point; and an adjustment module, configured to adjust the first virtual face model to a second virtual face model based on the adjustment manner of the at least one to-be-adjusted key point.

In another embodiment of the present disclosure, an electronic device is provided. The electronic device includes at least one processor and a memory communicatively connected with the at least one processor. The memory is configured to store at least one instruction executable by the at least one processor. The at least one instruction is performed by the at least one processor, to cause the at least one processor to perform the method for adjusting the virtual face model mentioned above.

In another embodiment of the present disclosure, a non-transitory computer-readable storage medium storing at least one computer instruction is provided. The at least one computer instruction is used for a computer to perform the method for adjusting the virtual face model mentioned above.

In another embodiment of the present disclosure, a computer program product is provided. The computer program product includes a computer program. The method for adjusting the virtual face model mentioned above is implemented when the computer program is performed by a processor.

It is to be understood that, the content described in this section is not intended to identify the key or important features of the embodiments of the present disclosure, nor is it intended to limit the scope of the present disclosure. Other features of the present disclosure will become easy to understand through the following description.

BRIEF DESCRIPTION OF THE DRAWINGS

Drawings are used for better understanding the solution, and are not intended to limit the present disclosure.

DETAILED DESCRIPTION

Exemplary embodiments of the present disclosure are described in detail below with reference to the drawings, including various details of the embodiments of the present disclosure to facilitate understanding, and should be regarded as exemplary. Thus, those of ordinary skilled in the art shall understand that, variations and modifications can be made on the embodiments described herein, without departing from the scope and spirit of the present disclosure. Likewise, for clarity and conciseness, descriptions of well-known functions and structures are omitted in the following description.

It is to be noted that terms "first", "second" and the like in the description, claims and The mentioned drawings of the present disclosure are used for distinguishing similar objects rather than describing a specific sequence or a precedence order. It should be understood that the data used in such a way may be exchanged where appropriate, in order that the embodiments of the present disclosure described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be contained instead.

An embodiment of the present disclosure provides a method for adjusting a virtual face model. It is to be noted that the steps shown in the flow diagram of the accompanying drawings may be executed in a computer system, such as a set of computer-executable instructions, and although a logical sequence is shown in the flow diagram, in some cases, the steps shown or described may be executed in a different order than here.

Figure 1:
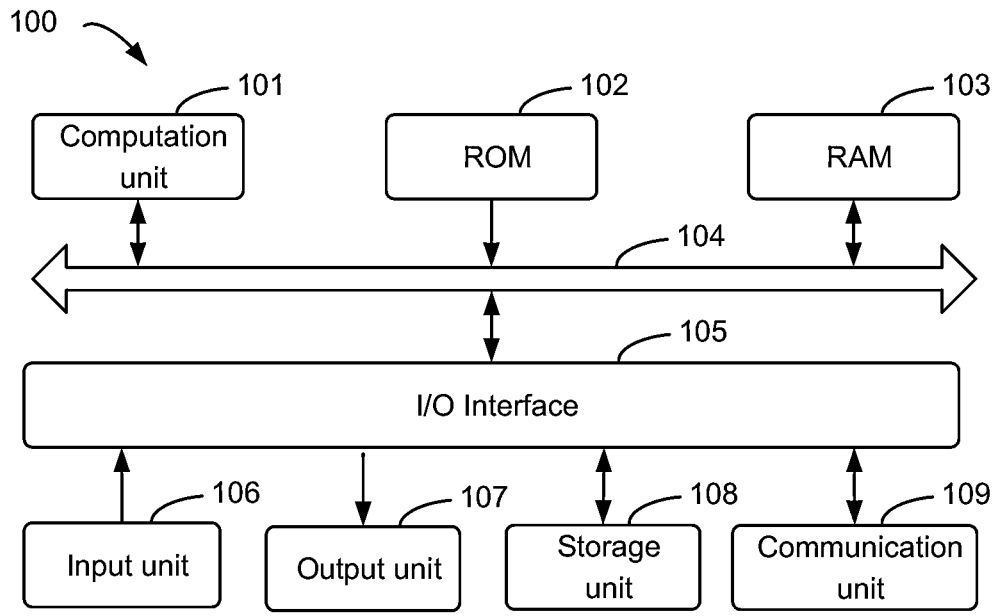
FIG. 1 is a structural block diagram of a hardware structure of a computer terminal (or a mobile device) configured to implement a method for adjusting a virtual face model according to an embodiment of the present disclosure.

The method embodiment provided in this present disclosure may be performed in a mobile terminal, a computer terminal, or a similar electronic device. The electronic device is intended to represent various forms of digital computers, such as laptop computers, desktop computers, workbenches, personal digital assistants, servers, blade servers, mainframe computers, and other suitable computers. The electronic device may also express various forms of mobile devices, such as personal digital processing, cellular phones, smart phones, wearable devices, and other similar computing devices. Connections, relationships, and functions of components shown herein are examples, and are not intended to limit the implementation of the present disclosure described and/or required herein. FIG. 1 shows a structural block diagram of a hardware structure of a computer terminal (or a mobile device) configured to implement a method for adjusting a virtual face model according to an embodiment of the present disclosure.

As shown in FIG. 1, the computer terminal 100 includes a computing unit 101. The computing unit may perform various appropriate actions and processing operations according to a computer program stored in a read-only memory (ROM) 102 or a computer program loaded from a storage unit 108 into a random access memory (RAM) 103. In the RAM 103, various programs and data required for the operation of the computer terminal 100 may also be stored. The computing unit 101, the ROM 102, and the RAM 103 are connected with each other by using a bus 104. An input/output (I/O) interface 105 is further connected with the bus 104.

Multiple components in the computer terminal 100 are connected with the I/O interface 105, and include: an input unit 106, such as a keyboard and a mouse; an output unit 107, such as various types of displays and loudspeakers; the storage unit 108, such as a disk and an optical disc; and a communication unit 109, such as a network card, a modem, and a wireless communication transceiver. The communication unit 109 allows the computer terminal 100 to exchange information or data with other devices through a computer network, such as the Internet, and/or various telecommunication networks.

The computing unit 101 may be various general and/or special processing assemblies with processing and computing capabilities. Some examples of computing unit 101 include, but are not limited to, a central processing unit (CPU), a graphics processing unit (GPU), various dedicated artificial intelligence (AI) computing chips, various computing units for running machine learning model algorithms, a digital signal processor (DSP), and any appropriate processors, controllers, microcontrollers, etc. The computing unit 101 performs the method for adjusting the virtual face model described here. For example, in some embodiments, the method for adjusting the virtual face model may be implemented as a computer software program, which is tangibly contained in a machine-readable medium, such as the storage unit 108. In some embodiments, part or all of the computer program may be loaded and/or installed on the computer terminal 100 via the ROM 102 and/or the communication unit 109. When the computer program is loaded into the RAM 103 and performed by the computing unit 101, at least one step of the method for adjusting the virtual face model described here may be performed. Alternatively, in other embodiments, the computing unit 101 may be configured to perform the method for adjusting the virtual face model in any other suitable manners (for example, by means of firmware).

Various implementations of systems and technologies described here may be implemented in a digital electronic circuit system, an integrated circuit system, a field programmable gate array (FPGA), an application-specific integrated circuit (ASIC), an application-specific standard product (ASSP), a system-on-chip (SOC), a complex programmable logic device (CPLD), computer hardware, firmware, software, and/or a combination thereof. These various implementations may include: being implemented in at least one computer program, the at least one computer program may be performed and/or interpreted on a programmable system including at least one programmable processor. The programmable processor may be a dedicated or general programmable processor, which may receive data and instructions from a storage system, at least one input device, and at least one output device, and transmit the data and instructions to the storage system, the at least one input device, and the at least one output device.

It is noted herein that, in some optional embodiments, the electronic device shown in FIG. 1 may include a hardware element (including a circuit), a software element (including a computer code stored on the computer-readable medium), or a combination of the hardware element and the software element. It should be noted that, FIG. 1 is an example of a specific example, and is intended to illustrate the types of components that may be present in the electronic device.

Figure 2:
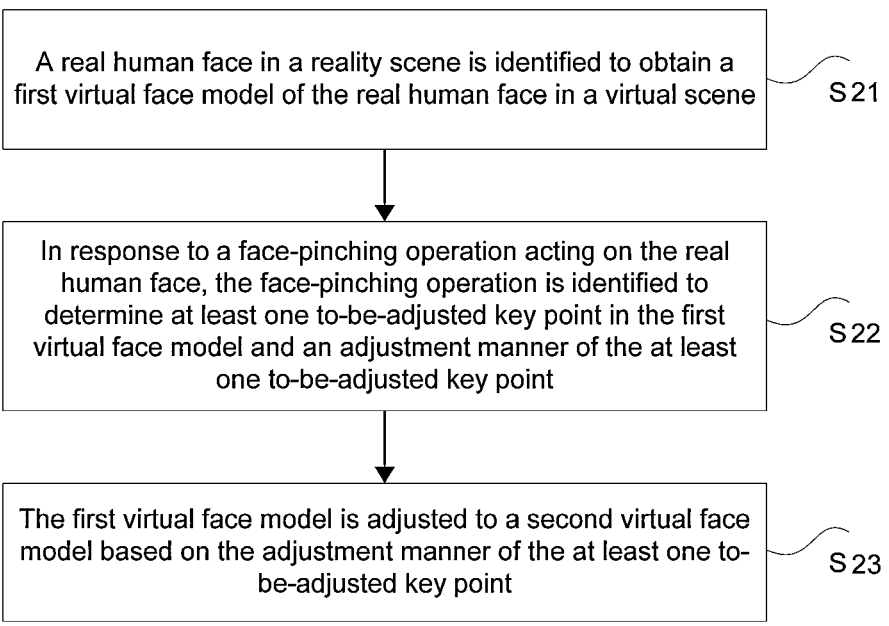
FIG. 2 is a flowchart of a method for adjusting a virtual face model according to an embodiment of the present disclosure.

Under The operation environment, the present disclosure provides the method for adjusting a virtual face model shown in FIG. 2. The method may be performed by the computer terminal shown in FIG. 1 or a similar electronic device. FIG. 2 is a flowchart of a method for adjusting a virtual face model according to an embodiment of the present disclosure. As shown in FIG. 2, a method may include the following steps.

At Step S21, a real human face in a reality scene is identified to obtain a first virtual face model of the real human face in a virtual scene.

The reality scene may be a real scene where a user is located currently.

The virtual scene may be a scene in a virtual image application, and may be preset by using an application underlying code.

Optionally, the virtual scene is switched in response to the scene selection operation of the user. For example, the preset virtual scene may include a beach scene, a snow mountain scene, a desert scene, and a city scene. The user may click a scene switching control on a graphical user interface to switch the virtual scene. When the current virtual scene is the beach scene, a to-be-switched scene is the snow mountain scene. The beach scene may be switched to the snow mountain scene by clicking the scene switching control corresponding to the snow mountain scene.

The first virtual face model is a face model corresponding to the real human face, and may be a two-dimensional model or a three-dimensional model.

Specifically, an implementation process of identifying the real human face in the reality scene to obtain the first virtual face model of the real human face in the virtual scene may refer to any conventional face identification modeling solution, which is not described again.

At Step S22, in response to a face-pinching operation acting on the real human face, the face-pinching operation is identified to determine at least one to-be-adjusted key point in the first virtual face model and an adjustment manner of the at least one to-be-adjusted key point.

Through the face-pinching operation acting on the real human face, at least one key point of the real human face may be correspondingly deformed, so that the at least one to-be-adjusted key point in the first virtual face model corresponding to the real human face is changed accordingly.

Optionally, identification on the face-pinching operation includes identification on a face-pinching gesture of the user and identification on the real human face of the user. Specifically, through identifying the face-pinching gesture to act on at least one position of the real human face, the at least one key point of real human face deformation and an adjustment manner of the at least one key point are determined, so as to further identify the real human face to determine the at least one to-be-adjusted key point in the first virtual face model and the adjustment manner of the at least one to-be-adjusted key point.

Specifically, an implementation process of, in response to the face-pinching operation acting on the real human face, identifying the face-pinching operation to determine the at least one to-be-adjusted key point in the first virtual face model and the adjustment manner of the at least one to-be-adjusted key point may be further introduced with reference to the embodiments of the present disclosure.

At Step S23, the first virtual face model is adjusted to a second virtual face model based on the adjustment manner of the at least one to-be-adjusted key point.

The second virtual face model an adjusted virtual face model in the virtual scene, which is more in line with demands of the user.

Specifically, an implementation process of adjusting the first virtual face model to the second virtual face model based on the adjustment manner of the at least one to-be-adjusted key point may be further introduced with reference to the embodiments of the present disclosure.

According to steps S21 to S23 in the present disclosure, the real human face in the reality scene is identified to obtain the first virtual face model of the real human face in the virtual scene. In response to the face-pinching operation acting on the real human face, the face-pinching operation is identified to determine the at least one to-be-adjusted key point in the first virtual face model and the adjustment manner of the at least one to-be-adjusted key point. The first virtual face model is adjusted to the second virtual face model based on the adjustment manner of the at least one to-be-adjusted key point. In this way, a purpose of intelligently adjusting a virtual image is achieved, operation steps of simplified and adjusted the virtual image are realized, and an effect of user experience is enhanced. Therefore, the technical problem of tedious operation steps and poor user experience of solutions for adjusting the virtual image in the related art can be solved.

The method for adjusting a virtual face model in the embodiment is further described below.

As an optional implementation, the step S22 of identifying the face-pinching operation to determine the at least one to-be-adjusted key point in the first virtual face model includes the following steps.

At Step S221, the face-pinching operation is identified to determine an action object of the face-pinching operation. The at least one action object includes at least one of facial features of the real human face or a face shape of the real human face.

At Step S222, the at least one to-be-adjusted key point is selected from multiple key points contained in the first virtual face model based on the at least one action object.

The multiple key points contained in the first virtual face model include: key points of a facial feature model corresponding to facial features of the real human face and key points of a face shape model corresponding to the face shape of the real human face.

As an optional implementation, step S22 of identifying the face-pinching operation to determine the adjustment manner of the at least one to-be-adjusted key point includes the following steps.

At Step S223, the face-pinching operation is identified to determine deformation of the at least one action object caused by the face-pinching operation.

The deformation of the at least one action object may include at least one of left and right expansion, up and down expansion, overall enlargement, or overall reduction.

At Step S224, the adjustment manner of the at least one to-be-adjusted key point is determined based on the deformation of the at least one action object.

The adjustment manner of the at least one to-be-adjusted key point corresponds to the deformation of the at least one action object, and may include at least one of left and right expansion, up and down expansion, overall enlargement, or overall reduction.

Optionally, the adjustment manner of the at least one to-be-adjusted key point may be determined based on at least one deformations of the at least one action object. When the one-time adjustment of the first virtual face model is not in place, multiple face-pinching operations may be continuously performed based on a current adjustment result, so that a final adjustment result is more in line with demands of a client. Therefore, the user experience of the user is further improved.

For example, the user pinches and pulls the upper, lower, left and right corners of the eyes and the mouth by using "thumbs and index fingers". After a pinching and pulling gesture and the real human face of the user are identified, the at least one to-be-adjusted key point in the first virtual face model is determined as the eyes and the mouth. Based on the deformation of the eyes and the mouth, the adjustment manner is determined by stretching or shrinking the upper, lower, left, and right corners of the at least one to-be-adjusted key point accordingly.

For another example, the user pinches the wing of nose or pulls the nostril by using "the thumbs and the index fingers". After the gesture and the real human face of the user are identified, the at least one to-be-adjusted key point in the first virtual face model is determined as the wing of nose or the nostril. Based on the deformation of the wing of nose or the nostril, the adjustment manner is determined by stretching or shrinking the at least one to-be-adjusted key point accordingly.

For another example, the user pinches the bridge of the nose by using "the thumbs and the index fingers". After the gesture and the real human face of the user are identified, the at least one to-be-adjusted key point in the first virtual face model is determined as the bridge of the nose. Based on the deformation of the bridge of the nose, the adjustment manner is determined by stretching or shrinking the at least one to-be-adjusted key point accordingly.

For another example, the user pinches two corners of the eyebrow by using "the thumbs and the index fingers". After the gesture and the real human face of the user are identified, the at least one to-be-adjusted key point in the first virtual face model is determined as the eyebrow. Based on the deformation of the eyebrow, the adjustment manner is determined by stretching or shrinking left and right ends of the at least one to-be-adjusted key point accordingly.

As an optional implementation, step S224 of determining the adjustment manner of the at least one to-be-adjusted key point based on the deformation of the at least one action object includes the following steps.

At Step S2241, a moving direction of the at least one to-be-adjusted key point is determined based on a deformation direction of the at least one action object. The deformation direction is mirror symmetrical with the moving direction.

At Step S2242, a moving distance of the at least one to-be-adjusted key point is determined based on a deformation amplitude of the at least one action object.

As an optional implementation, step S23 of adjusting the first virtual face model to the second virtual face model based on the adjustment manner of the at least one to-be-adjusted key point includes the following steps.

At Step S231, an initial position of the at least one to-be-adjusted key point on the first virtual face model is acquired.

At Step S232, a target position of the at least one to-be-adjusted key point is determined by using the initial position, the moving direction, and the moving distance.

At Step S233, the first virtual face model is adjusted to the second virtual face model based on the target position.

As an optional implementation, the method for adjusting a virtual face model further includes the following step. The at least one to-be-adjusted key point is displayed on the first virtual face model according to a preset display manner. The preset display manner is determined by using at least one of the following parameters: a display size, a display color, a display brightness, and a display special effect.

In the present disclosure, the real human face in the reality scene is identified to obtain the first virtual face model of the real human face in the virtual scene. In response to the face-pinching operation acting on the real human face, the face-pinching operation is identified to determine the at least one to-be-adjusted key point in the first virtual face model and the adjustment manner of the at least one to-be-adjusted key point. The first virtual face model is adjusted to the second virtual face model based on the adjustment manner of the at least one to-be-adjusted key point. In this way, a purpose of intelligently adjusting a virtual image is achieved, operation steps of simplified and adjusted the virtual image are realized, and an effect of user experience is enhanced. Therefore, the technical problem of tedious operation steps and poor user experience of solutions for adjusting the virtual image in the related art can be solved.

In the technical solution of the present disclosure, the involved processing such as acquisition, storage, application, processing, transmission, providing, and present disclosure of personal information of the user are in compliance with relevant laws and regulations, and does not violate public order and good customs.

From the descriptions about the implementation modes, those skilled in the art may clearly know that the method according to the foregoing embodiments may be implemented in a manner of combining software and a necessary universal hardware platform, and of course, may also be implemented through hardware, but the former is a exemplary implementation mode under many circumstances. Based on such an understanding, the technical solutions of the present disclosure substantially or parts making contributions to the conventional art may be embodied in form of a software product, and the computer software product is stored in a storage medium, including multiple instructions for causing a terminal device (which may be a mobile phone, a computer, a server, a network device or the like) to execute the method in each embodiment of the present disclosure.

The present disclosure further provides an apparatus for adjusting a virtual face model. The apparatus is configured to implement the foregoing embodiments and the exemplary implementation, and what has been described will not be described again. As used below, the term "module" may be a combination of software and/or hardware that implements a predetermined function. Although the apparatus described in the following embodiments is optionally implemented in software, but implementations in hardware, or a combination of software and hardware, are also possible and conceived.

Figure 3:
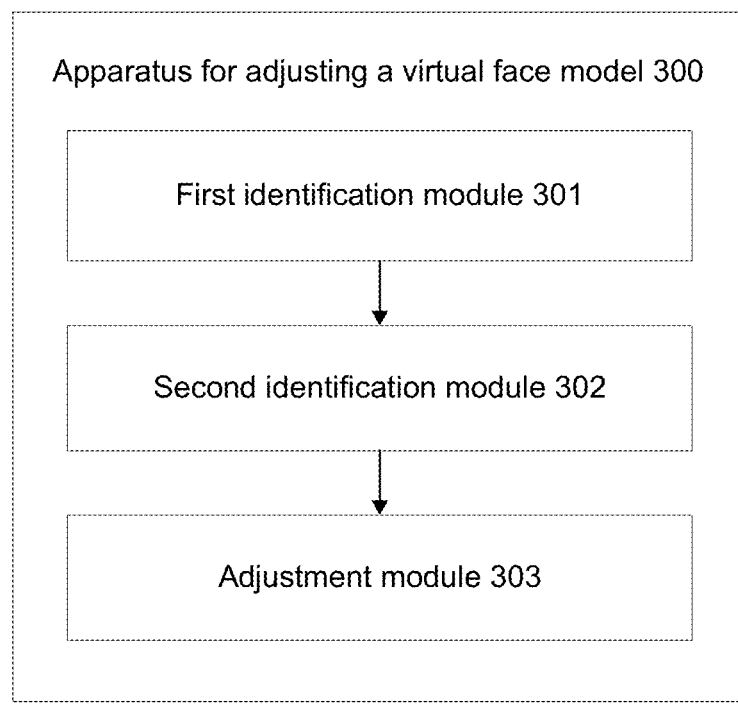
FIG. 3 is a structural block diagram of an apparatus for adjusting a virtual face model according to an embodiment of the present disclosure.

FIG. 3 is a structural block diagram of an apparatus for adjusting a virtual face model according to an embodiment of the present disclosure. As shown in FIG. 3, the apparatus 300 for adjusting the virtual face model includes a first identification module 301, a second identification module 302, and an adjustment module 303.

The first identification module 301 is configured to identify a real human face in a reality scene to obtain a first virtual face model of the real human face in a virtual scene.

The second identification module 302 is configured to, in response to a face-pinching operation acting on the real human face, identify the face-pinching operation to determine at least one to-be-adjusted key point in the first virtual face model and an adjustment manner of the at least one to-be-adjusted key point.

The adjustment module 303 is configured to adjust the first virtual face model to a second virtual face model based on the adjustment manner of the at least one to-be-adjusted key point.

Optionally, the second identification module 302 is configured to identify the face-pinching operation to determine an action object of the face-pinching operation, where the at least one action object includes at least one of facial features of the real human face or a face shape of the real human face; and select the at least one to-be-adjusted key point from multiple key points contained in the first virtual face model based on the at least one action object.

Optionally, the second identification module 302 is configured to identify the face-pinching operation to identify the face-pinching operation to determine deformation of the at least one action object caused by the face-pinching operation; and determine the adjustment manner of the at least one to-be-adjusted key point based on the deformation of the at least one action object.

Optionally, the second identification module 302 is configured to determine a moving direction of the at least one to-be-adjusted key point based on a deformation direction of the at least one action object, where the deformation direction is mirror symmetrical with the moving direction; and determine a moving distance of the at least one to-be-adjusted key point based on a deformation amplitude of the at least one action object.

Optionally, the adjustment module 303 is configured to acquire an initial position of the at least one to-be-adjusted key point on the first virtual face model; determine a target position of the at least one to-be-adjusted key point by using the initial position, the moving direction, and the moving distance; and adjust the first virtual face model to the second virtual face model based on the target position.

Optionally, the apparatus 300 for adjusting the virtual face model further includes a display module 304. The display module 304 is configured to display the at least one to-be-adjusted key point on the first virtual face model according to a preset display manner. The preset display manner is determined by using at least one of the following parameters: a display size, a display color, a display brightness, and a display special effect.

It is to be noted that, each of the modules may be implemented by software or hardware. For the latter, it may be implemented in the following manners, but is not limited to the follow: the modules are all located in a same processor; or the modules are located in different processors in any combination.

In an embodiment of the present disclosure, the present disclosure further provides an electronic device. The electronic device includes a memory and at least one processor. The memory is configured to store at least one computer instruction. The processor is configured to operation the at least one computer instruction to perform steps in the method embodiments.

Optionally, the electronic device may further include a transmission device and an input/output device. The transmission device is connected with the processor. The input/output device is connected with the processor.

Optionally, in the present disclosure, the processor may be configured to perform the following steps through the computer instruction.

At Step S1, a real human face in a reality scene is identified to obtain a first virtual face model of the real human face in a virtual scene.

At Step S2, in response to a face-pinching operation acting on the real human face, the face-pinching operation is identified to determine at least one to-be-adjusted key point in the first virtual face model and an adjustment manner of the at least one to-be-adjusted key point.

At Step S3, the first virtual face model is adjusted to a second virtual face model based on the adjustment manner of the at least one to-be-adjusted key point.

Optionally, for specific examples in this embodiment, refer to the examples described in the foregoing embodiments and the optional implementations, and this embodiment will not be repeated thereto.

In an embodiment of the present disclosure, the present disclosure further provides a non-transitory computer-readable storage medium storing at least one computer instruction. The non-transitory computer-readable storage medium is configured to store the at least one computer instruction. Steps in any of the method embodiments are performed when the at least one computer instruction is operated.

Optionally, in this embodiment, the non-transitory computer-readable storage medium may be configured to store a computer program for performing the following steps.

At Step S1, a real human face in a reality scene is identified to obtain a first virtual face model of the real human face in a virtual scene.

At Step S2, in response to a face-pinching operation acting on the real human face, the face-pinching operation is identified to determine at least one to-be-adjusted key point in the first virtual face model and an adjustment manner of the at least one to-be-adjusted key point.

At Step S3, the first virtual face model is adjusted to a second virtual face model based on the adjustment manner of the at least one to-be-adjusted key point.

Optionally, in this embodiment, the non-transitory computer-readable storage medium may include, but is not limited to, an electronic, magnetic, optical, electromagnetic, infrared, or semiconductor system, device, or apparatus, or any foregoing suitable combinations. More specific examples of the readable storage medium may include electrical connections based on at least one wire, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any above suitable combinations.

In an embodiment of the present disclosure, the present disclosure further provides a computer program product. Program codes used to implement the audio processing method of the present disclosure can be written in any combination of at least one programming language. These program codes can be provided to the processors or controllers of general computers, special computers, or other programmable data processing devices, so that, when the program codes are performed by the processors or controllers, functions/operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

In the embodiments of the present disclosure, the description of the embodiments has its own focus. For parts that are not described in detail in a certain embodiment, reference may be made to related descriptions of other embodiments.

In the several embodiments provided in the present disclosure, it should be understood that, the disclosed technical content can be implemented in other ways. The apparatus embodiments described above are illustrative. For example, the division of the units may be a logical function division, and there may be other divisions in actual implementation. For example, multiple units or components may be combined or integrated into another system, or some features can be ignored, or not implemented. In addition, the displayed or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, that is, the components may be located in one place, or may be distributed on the multiple units. Part or all of the units may be selected according to actual requirements to achieve the purposes of the solutions of this embodiment.

In addition, the functional units in the various embodiments of the present disclosure may be integrated into one processing unit, or each unit may exist alone physically, or at least two units may be integrated into one unit. The integrated unit can be implemented in the form of hardware, or can be implemented in the form of a software functional unit.

When the integrated unit is implemented in the form of the software functional unit and sold or used as an independent product, it can be stored in the computer readable storage medium. Based on this understanding, the technical solutions of the present disclosure essentially or the parts that contribute to the prior art, or all or part of the technical solutions can be embodied in the form of a software product. The computer software product is stored in a storage medium, including multiple instructions for causing a computer device (which may be a personal computer, a server, or a network device, and the like) to execute all or part of the steps of the method described in the various embodiments of the present disclosure. The foregoing storage medium includes a USB flash disk, an ROM, an RAM, and various media that can store program codes, such as a mobile hard disk, a magnetic disk, or an optical disk.

The description is exemplary implementations of the present disclosure, and it should be noted that persons of ordinary skill in the art may also make several improvements and refinements without departing from the principle of the present disclosure, and it should be considered that these improvements and refinements shall all fall within the protection scope of the present disclosure.

What is claimed is:

1. A method for adjusting a virtual face model, comprising:
   identifying a real human face in a reality scene to obtain a first virtual face model of the real human face in a virtual scene;
   in response to a face-pinching operation acting on the real human face, identifying the face-pinching operation to determine at least one to-be-adjusted key point in the first virtual face model and an adjustment manner of the at least one to-be-adjusted key point; and
   adjusting the first virtual face model to a second virtual face model based on the adjustment manner of the at least one to-be-adjusted key point;
   wherein identifying the face-pinching operation to determine the adjustment manner of the at least one to-be-adjusted key point comprises:
   identifying the face-pinching operation to determine deformation of the at least one action object caused by the face-pinching operation;
   determining a moving direction of the at least one to-be-adjusted key point based on a deformation direction of the at least one action object, wherein the deformation direction is mirror symmetrical with the moving direction; and
   determining a moving distance of the at least one to-be-adjusted key point based on a deformation amplitude of the at least one action object.

2. The method as claimed in claim 1, wherein identifying the face-pinching operation to determine the at least one to-be-adjusted key point in the first virtual face model and the adjustment manner of the at least one to-be-adjusted key point comprises:
   identifying the face-pinching operation to determine at least one action object of the face-pinching operation, wherein the at least one action object comprises at least one of facial features of the real human face or a face shape of the real human face; and
   selecting the at least one to-be-adjusted key point from a plurality of key points contained in the first virtual face model based on the at least one action object.

3. The method as claimed in claim 2, wherein identification on the face-pinching operation comprises: identification on a face-pinching gesture and identification on the real human face.

4. The method as claimed in claim 3, wherein identifying the face-pinching operation to determine the at least one action object comprise:
   identifying the face-pinching gesture to act on at least one position of the real human face to determine the at least one action object.

5. The method as claimed in claim 3, wherein selecting the at least one to-be-adjusted key point from the plurality of key points based on the at least one action object comprise:
   selecting the at least one to-be-adjusted key point from the plurality of key points based on the at least one key point of real human face deformation.

6. The method as claimed in claim 2, wherein the plurality of key points comprise:
   key points of a facial feature model corresponding to the facial features of the real human face; and
   key points of a face shape model corresponding to the face shape of the real human face.

7. The method as claimed in claim 1, wherein adjusting the first virtual face model to the second virtual face model based on the adjustment manner of the at least one to-be-adjusted key point comprises:
   acquiring an initial position of the at least one to-be-adjusted key point on the first virtual face model;
   determining a target position of the at least one to-be-adjusted key point by using the initial position, a moving direction, and a moving distance; and
   adjusting the first virtual face model to the second virtual face model based on the target position.

8. The method as claimed in claim 1, further comprising:
   displaying the at least one to-be-adjusted key point on the first virtual face model according to a preset display manner, wherein the preset display manner is determined by using at least one of the following parameters: a display size, a display color, a display brightness, and a display special effect.

9. The method as claimed in claim 1, wherein the reality scene is a real scene where a user is located currently.

10. The method as claimed in claim 1, wherein the virtual scene is a scene in a virtual image application.

11. The method as claimed in claim 1, further comprising:
    in response to a scene selection operation acting on a scene switching control on a graphical user interface, the virtual scene is switched.

12. An electronic device, comprising:
    at least one processor, and
    a memory, communicatively connected with the at least one processor, wherein
    the memory is configured to store at least one instruction executable by the at least one processor, and the at least one instruction is performed by the at least one processor, to cause the at least one processor to perform the following steps:
    identifying a real human face in a reality scene to obtain a first virtual face model of the real human face in a virtual scene;
    in response to a face-pinching operation acting on the real human face, identifying the face-pinching operation to determine at least one to-be-adjusted key point in the first virtual face model and an adjustment manner of the at least one to-be-adjusted key point; and adjusting the first virtual face model to a second virtual face model based on the adjustment manner of the at least one to-be-adjusted key point;

wherein identifying the face-pinching operation to determine the adjustment manner of the at least one to-be-adjusted key point comprises:

identifying the face-pinching operation to determine deformation of the at least one action object caused by the face-pinching operation;

determining a moving direction of the at least one to-be-adjusted key point based on a deformation direction of the at least one action object, wherein the deformation direction is mirror symmetrical with the moving direction; and determining a moving distance of the at least one to-be-adjusted key point based on a deformation amplitude of the at least one action object.

13. A non-transitory computer-readable storage medium, storing at least one computer instruction, wherein the at least one computer instruction is used for a computer to perform the following steps:

identifying a real human face in a reality scene to obtain a first virtual face model of the real human face in a virtual scene;

in response to a face-pinching operation acting on the real human face, identifying the face-pinching operation to determine at least one to-be-adjusted key point in the first virtual face model and an adjustment manner of the at least one to-be-adjusted key point; and adjusting the first virtual face model to a second virtual face model based on the adjustment manner of the at least one to-be-adjusted key point;

wherein identifying the face-pinching operation to determine the adjustment manner of the at least one to-be-adjusted key point comprises:

identifying the face-pinching operation to determine deformation of the at least one action object caused by the face-pinching operation;

determining a moving direction of the at least one to-be-adjusted key point based on a deformation direction of the at least one action object, wherein the deformation direction is mirror symmetrical with the moving direction; and determining a moving distance of the at least one to-be-adjusted key point based on a deformation amplitude of the at least one action object.

\* \* \* \* \*